United States Patent [19]

Duperray et al.

[11] Patent Number: 4,569,821
[45] Date of Patent: Feb. 11, 1986

[54] METHOD OF PREPARING A POROUS METAL BODY

[75] Inventors: Gérard Duperray, Arpajon; Michel Hilaire, Les Ulis, both of France

[73] Assignee: Compagnie Generale d'Electricite, S.A., Paris, France

[21] Appl. No.: 467,805

[22] Filed: Feb. 18, 1983

[30] Foreign Application Priority Data

Feb. 24, 1982 [FR] France ............................ 82 03034

[51] Int. Cl.$^4$ ............................................. B22F 1/00
[52] U.S. Cl. ........................................ 419/2; 419/34; 419/36; 419/37; 419/63; 419/65; 75/20 F; 428/304.4
[58] Field of Search .................. 419/36, 37, 2, 34, 63, 419/65; 75/20 F; 428/304.4

[56] References Cited

U.S. PATENT DOCUMENTS

| | | | |
|---|---|---|---|
| 1,919,730 | 7/1933 | Koenig | 419/2 |
| 3,111,396 | 11/1963 | Ball | 419/2 |
| 3,549,423 | 12/1970 | Grubb et al. | 419/2 |
| 4,064,331 | 12/1977 | Patton et al. | 419/36 |
| 4,483,905 | 11/1984 | Engström | 419/2 |

Primary Examiner—Stephen J. Lechert, Jr.
Attorney, Agent, or Firm—Kenyon & Kenyon

[57] ABSTRACT

A porous metal body, e.g. an electrode for an electric cell, is prepared using the following steps:

preparing a foam by adding a surface active agent and a gelling agent to water and then foaming the mixture by stirring and/or blowing air through it;

incorporating metal powder in the foam in order to obtain a suspension of the metal therein;

shaping the foam with its suspension of metal, and adding a stabilizing agent thereto, said stabilizing agent being one which polymerizes on contact with water, thereby causing the shaped foam to set in shape; and heating the set foam to pyrolize the organic material therein and to sinter the metal.

This method produces a more even and a more reliable pore size than has previously been possible.

20 Claims, 3 Drawing Figures

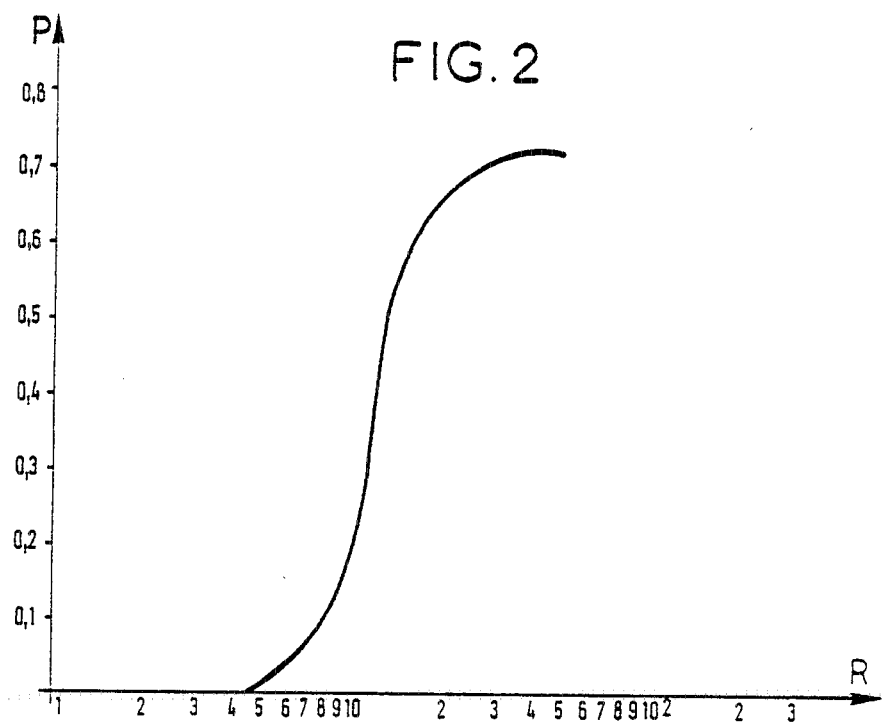
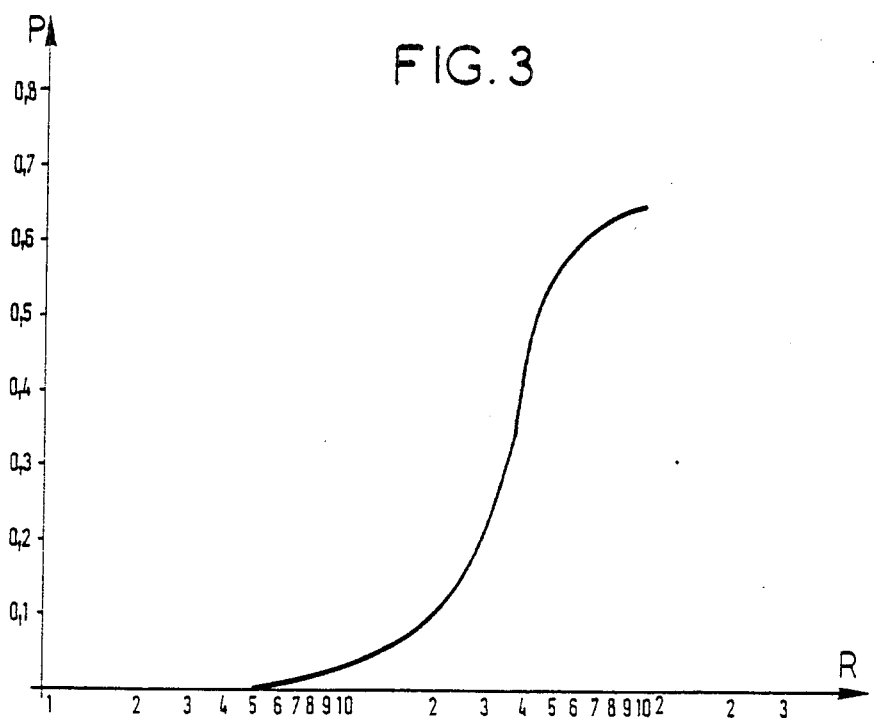

METHOD OF PREPARING A POROUS METAL BODY

The present invention relates to a method of preparing a porous metal body which is particularly applicable to making electrodes for electrochemical cells.

BACKGROUND OF THE INVENTION

One known method of making porous sintered nickel plates starts with a mixture comprising nickel powder, water, a plasticizer such as polyethylene glycol, and a processing agent which is preferably polyvinyl alcohol.

Such a method is described, for example, in U.S. Pat. No. 3,186,871.

After air has been added to the mixture to make it foam, the mixture is shaped and then heated, thereby drying it and sintering it and at the same time eliminating the plasticizer and the processing agent.

Nonetheless, various drawbacks have been observed with this process, in that the more or less foamy structure of the mixture collapses during heating thereby reducing its degree of porosity and leading to a substantially void-free structure inside the sintered material.

Porous metal bodies can also be made from metal-impregnated organic foams, e.g. polyurethane foam, which is subsequently heated. Such metallized foams can be prepared by mixing monomers with metal particles, and then triggering both the foaming and the solidification of the resin. Such a method is described, for example, in French Patent Specification No. 1 573 863. The large proportion of organic matter in comparison with the metal component in the resulting foam is a major source of drawbacks.

The elimination of organic matter during heating is a source of trouble and, in particular, the resulting high degree of shrinkage is a factor which tends to reduce porosity and which also often leads to cracking.

Preferred implementations of the present invention enable the above-mentioned drawbacks to be reduced. In particular, the method of the present invention can be used to produce a porous metal body with a predetermined pore fineness lying in the range 7 to 100 microns maximum, and this can be done starting from any of the commercially available powders. Furthermore, the method is reliable and easy to perform.

SUMMARY OF THE INVENTION

The present invention provides a method of preparing a porous metal body comprising the steps of:
  preparing a foam by adding a surface active agent and a gelling agent to water and then foaming the mixture by stirring and/or blowing air through it;
  incorporating metal powder in the foam in order to obtain a suspension of the metal therein;
  shaping the foam with its suspension of metal, and adding a stabilising agent thereto, said stabilising agent being one which polymerises on contact with water, thereby causing the shaped foam to set in shape; and
  heating the set foam to pyrolise the organic material therein and to sinter the metal.

BRIEF DESCRIPTION OF THE DRAWINGS

The invention is described by way of examples and with reference to the accompanying drawings, in which:

FIGS. 2 and 3 are graphs showing the porosity characteristics of porous metal bodies obtained in accordance with the invention.

MORE DETAILED DESCRIPTION

Figure 1:
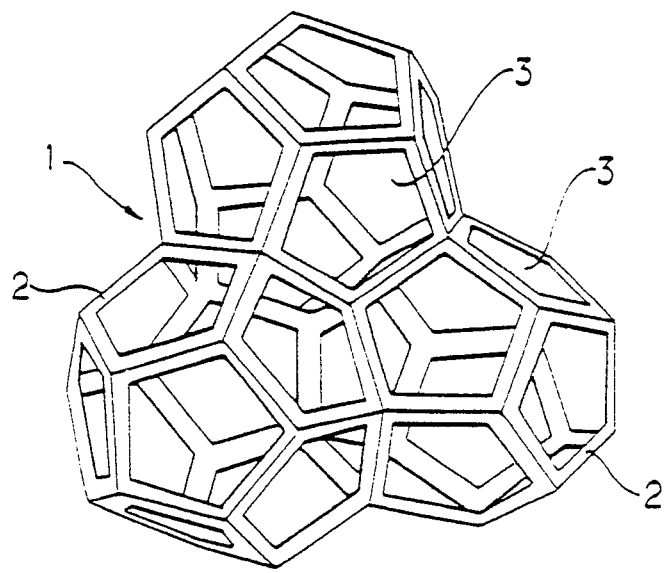
FIG. 1 is a perspective view of a microscopic fragment of a porous metal body obtained in accordance with the invention.

In one implementation of the method in accordance with the invention, a porous metal body is prepared as follows:

Initially, a water-based foam is produced by mechanically stirring and/or by blowing air into water having 3 to 7 g/l (grams per liter) surface-active (or wetting) agent added thereto together with 5 to 15 g/l of gelling agent.

It is observed that, depending on the concentrations of the additives and the vigour of the stirring and/or the air blowing, the resulting volume of foam is between three to six times the initial volume.

An ordinary surface-active agent is used; it may be of the anionic type (e.g. an alkyl sulphonate), it may be of the cationic type (e.g. a quaternary ammonium salt), or it may be of the non-ionic type (e.g. a polyether including an arylalkyl chain and an alcohol function).

The surface-active agent may be, for example, the non-ionic "Triton X 100" sold by Rohm and Haas.

A conventional gelling agent is used, chosen for example from the group consisting of: carboxymethylcellulose, polyvinyl pyrrolidone, polyvinyl alcohol, albumen, and agar-agar.

If the gelling agent were not present, the foam structure would be destroyed when the metal powder is incorporated. The powder is incorporated by stirring metal powder into the foam. The metal is advantageously chosen from the group consisting of: iron, cobalt, nickel, silver, chromium, lead, and alloys thereof. The quantity of metal added should be between about 30% and 300% of the weight of the foam, said quantity being predetermined as a function of the nature of the powder used and of the desired end porosity for the electrode.

Then, applying the invention, the structure of the water foam with its metal powder in suspension is stabilised by stirring in a stabilising agent suitable for polymerising on contact with water. Once the foam mixture has stabilised, it contains from 2% to 9% stabilising agent by weight. With less than 2% the foam structure does not set, while with more than 9% the above-mentioned drawbacks re-appear, and further, polymerisation takes place so fast that forming is difficult.

Preferably the stabilising agent belongs to the polyurethane family, and in particular it may be made from a mixture of a hydroxylated compound and an isocyanate.

Hydroxyl compounds of the following can thus be used: polyethylene glycols; polyalcohols; fatty acids condensed onto aliphatic chains; vegetable oils.

The following componds may be used as isocyanates: 2,4 or 2,6 toluene di-isocyanate (TDI); hexamethylene di-ioscyanate; p,p' diphenylmethane di-isocyanate; TDI condensed onto trimethylol-propane; aromatic polyisocyanate (Bayer's DESMODUR L); aliphatic polyisocyanate (Bayer's DESMODUR N).

A glycol prepolymer including active isocyanate functions may also be used. Such a product is sold, for example, by Tramico under the reference type PP20.

Said stabilising agent polymerises rapidly on coming into contact with water: in a few seconds at ambient temperatures, or in a few tens of seconds at temperatures around 0° C. A viscous product is thus obtained which can be poured onto a support so as to obtain a strip whose thickness is adjusted, e.g. to lie in the range 0.3 mm to 30 mm. Once polymerisation is complete, the strip is peeled off its support and then dried and optionally cut into pieces of desired sizes.

Finally, said strip is heated in a reducing atmosphere to maintain a temperature in the range 200° C. to 1,500° C. depending on the metal used for 1 to 60 minutes. An exception is silver which is heated in air, or in nitrogen-enriched air.

To clarify the appropriate temperature ranges, iron, cobalt and nickel are heated to 800° C. to 1200° C., chromium is heated to 1,000° C. to 1,500° C., silver to 800° C. to 900° C. and lead to 200° C. to 250° C.

Advantageously the reducing atmosphere may be hydrogen or an ammonia cracking gas.

During heating, the stabilising agent, the surface active or wetting agent, and the gelling agent are all pyrolised while the metal is sintered. The metal then has an open lattice-work structure of the type idealised in FIG. 1 which shows three adjacent pores having a dodecahedral framework.

It should be observed that the gas resulting from the pyrolysis must be evacuated or trapped during heating since, at least when the stabilising agent is of the polyurethane type, the gas includes a small quantity of free cyanohydric acid.

FIG. 1 shows how a porous metal body can be built up by juxtaposing dodecahedral pores 1 in a three dimensional array, with metal extending along their edges 2. Initially there is a thin film of metal across the generally pentagonal faces 3, but during heating the faces 3 burst leaving an open framework behind.

This technique can therefore be used to obtain a substantially uniform porosity, with average cell sizes lying in a selected portion of the range 7 to 100 microns.

The total porosity of such a structure is between 70% to 97%, and it is preferably 80% to 90%.

The above values depend on the conditions during mixing, stirring, and heating: e.g. the quantity and the nature of the metal powder used; the sintering temperature; the duration of stirring, etc.; with pore diameter being directly related to the conditions in which the water-based foam was produced. Thus the more vigorous the stirring at the foaming stage, the smaller the bubbles and hence the smaller the pore size.

FIGS. 2 and 3 are plots of porosity P in $cm^3/g$ in such structures as a function of the pore radius R in microns. The two curves are of substantially the same shape, but they are clustered around different pore sizes because of differing conditions during foam preparation.

The main advantages of structures made in accordance with the invention are as follows:

Firstly metal powders having special characteristics are not required; any readily available metal powder may be used.

Further, the pore size can be matched to most forseeable applications, that is to say that the majority of the pores are close to average in size and the size can be varied at will over the range 7 and 100 microns.

Also, the overall porosity which used to be limited to a maximum of about 85% can now be raised to as much as 95%.

Furthermore, the invention can easily be used to fabricate strips of desired thickness in the range 0.3 mm to 30 mm simply by varying the thickness of the foam as it is poured out. The strips may be calandered, compressed, cut up, welded or soldered without particular danger of cracking or crumbling.

There follow concrete examples of the invention being put into practice:

EXAMPLE NO. 1

75 $cm^3$ of an aqueous solution of 5 g/l of Triton X and 5 g/l carboxy-methyl-cellulose (CMC) is put into a receptacle. 500 $cm^3$ of foam are obtained by mechanical stirring, and then while still stirring, 50 g of ex-carbonyl nickel of the conventional type as sold by INCO, and having a density of 0.9, are added. The mixture is then cooled to 5° C. in a cooling bath and 7 $cm^3$ of PP20 type glycol prepolymer are added. After 15 seconds of vigorous stirring the mixture is poured onto a plate of glass covered with a sheet of water-dampened paper, said plate being maintained at 0° C. A scraper guided by distance pieces located on either side of the paper is used to spread the mixture uniformly over the entire papered area of the support, and then the top surface is covered with another sheet of water-dampened paper. After a few minutes of polymerisation, the product is removed from the support and the sheets of paper are torn off. The product is then dried in a forced draught oven and the strip is then cut up. The pieces are placed on a baking sheet and covered with a refractory powder such as alumina or silica and then placed in an oven for heat treatment. The pieces are heated to 1100° C. for one hour under a nitrogen atmosphere with 20% hydrogen. After cooling the resulting piece has shrunk by 37% longitudinally and by 30% transversally. The total porosity is 85% and the average pore radius is 25 microns.

EXAMPLE NO. 2

This example differs from example No. 1 in that 100 g of nickel powder are added, and sintering takes place at 1000° C. The resulting product has a total porosity of 85% and an average pore radius of 70 microns. Longitudinal shrinking is 30% while transverse shrinking is 32%.

EXAMPLE NO. 3

This example differs from example No. 1 in that the foaming solution contains 10 g/l of CMC and 5 g/l of TRITON X, with the nickel coming from 200 g of 2.2 density ex-carbonyl nickel sintered at 900° C. The resulting product has a total porosity of 82%, and an average pore radius of 25 microns. Longitudinal shrinking during sintering is only 10% while transverse shrinking is only 12%.

EXAMPLE NO. 4

This example differs from example No. 1 in that the foaming solution comprises 7 g/l of CMC and 7 g/l of TRITON X. The nickel powder is of the flaky type sold by MPD Technology and sintering takes place at 1000° C. The resulting product has a total porosity of 90%, an average pore radius of 12 microns and is subject to 41% longitudinal shrinking and 43% transverse shrinking during sintering.

EXAMPLE NO. 5

This example differs from example No. 1 in that the foaming solution comprises 7 g/l CMC and 5 g/l TRITON X. 200 g of nickel powder are used and the sintering temperature is 1100° C.

The resulting product has a total porosity of 97% and the average pore radius is 15 microns.

Compared with the prior methods mentioned above, the method according to the present invention has the following advantages:

1. The cellular structure of the foam is maintained, from the initial liquid foam right up to the final stage of sintered metal because:
   (a) the gelling agent prevents the foam from collapsing when the metal powder is added in; and
   (b) the stabilising agent polymerises on contact with water, thereby preventing the foam from collapsing during drying. Tests have shown that conventional binders such as polyethylene glycols (CARBOWAX) or polyvinyl alcohols are not suitable for this purpose.
2. The small quantity of stabilising agent required (2% to 9% and preferably 3% to 4%) leads to savings in raw materials and to a reduction in pollution, in that pyrolising polyurethane gives off small quantities of cyanohydric acid. The method described in French Patent Specification No. 1 573 863 which consists in making a polyurethane foam impregnated by incorporating metal powder in its initial monomers leads to percentages which are 5 to 10 times as high.
3. It can be performed using a very wide range of metal powder types, whereas methods which incorporate a metal powder into an aqueous CMC gel require a spongy type of powder, which is more expensive and harder to come by than common powders.
4. The average pore diameter can be varied at will over the range 7 microns to 100 microns by varying fabrication conditions.

Thus the diameter can be increased by increasing the quantity of surface active or wetting agent, by reducing the quantity of metal powder, or by increasing the quantity of stabilising agent since polyurethane stabilising agents give off $CO_2$ during polymerisation.

The diameter of the pores can be reduced by increasing the quantity of gelling agent, by stirring the foam for longer, and by increasing the duration and/or the temperature of sintering.

The invention is advantageously applied to the manufacture of electrodes in high energy electric cells.

We claim:

1. A method of preparing a porous metal body, the method comprising the steps of:
   (a) adding a surface active agent and a gelling agent to water;
   (b) agitating the mixture obtained from step (a) to produce a foam;
   (c) incorporating metal powder into the foam to obtain a suspension of the metal in the foam;
   (d) adding a stabilizing agent to the foam after step (c), said stabilizing agent being a material that polymerizes upon contact with water;
   (e) shaping the stabilized foam suspension;
   (f) allowing the shaped and stabilized foam suspension to set; and
   (g) heating the set foam to a temperature high enough to pyrolize the organic material therein and to sinter the suspended metal powder.

2. A method according to claim 1, wherein the surface active agent is of the non-ionic type and comprises a polyether having an arylalkyl chain and an alcohol function.

3. A method according to claim 1 wherein step (a) comprises adding 3 to 7 grams of surface active agent per liter of water.

4. A method according to claim 1 wherein the gelling agent is selected from the group consisting of carboxymethylcellulose; polyvinyl-pyrrolidone; polyvinyl alcohol; agar-agar; and albumen.

5. A method according to claim 1 wherein step (a) comprises adding 5 to 15 grams of gelling agent per liter of water.

6. A method according to claim 1 wherein step (b) comprises stirring the mixture to produce a foam.

7. A method according to claim 1 wherein step (b) comprises blowing air through the mixture to produce a foam.

8. A method according to claim 1 wherein step (c) comprises stirring into the foam an amount of metal powder from 30% to 300% by weight of the foam.

9. A method according to claim 1 wherein the stabilizing agent belongs to the polyurethane family.

10. A method according to claim 9 wherein the stabilizing agent is a prepolymer of glycol including active isocyanate functions, and step (d) comprises cooling the foam suspension to a temperature between ambient and 0 degrees C. when adding the stabilizing agent thereto.

11. A method according to claim 1 wherein step (d) comprises adding to the foam with a suspension of metal therein an amount of stabilizing agent from 2% to 9% by weight of the foam suspension.

12. A method according to claim 1 wherein the metal is selected from the group consisting of iron, cobalt, nickel, silver, chromium, lead, and alloys thereof.

13. A method according to claim 12 wherein the metal is selected from the group of iron, cobalt and nickel, and wherein step (g) comprises heating the set foam to a temperature substantially in the range from 800 degrees C. to 1200 degrees C.

14. A method according to claim 12 wherein the metal is chromium, and step (g) comprises heating the set foam to a temperature substantially in the range from 1000 degrees C. to 1500 degrees C.

15. A method according to claim 12 wherein the metal is lead, and step (g) comprises heating the set foam to a temperature substantially in the range from 200 degrees C. to 250 degrees C.

16. A method according to claim 13, 14, or 15 wherein step (g) comprises heating the set foam in a reducing atmosphere.

17. A method according to claim 12 wherein the metal is silver, and wherein step (g) comprises heating the set foam to a temperature substantially in the range from 800 degrees C. to 900 degrees C.

18. A method according to claim 17 wherein step (g) comprises heating the set foam in air.

19. A method according to claim 17 wherein step (g) comprises heating the set foam in an atmosphere of air enriched with nitrogen.

20. A porous metal body prepared by the steps of:
   (a) adding a surface active agent and a gelling agent to water;
   (b) agitating the mixture obtained from step (a) to produce a foam;
   (c) incorporating metal powder into the foam to obtain a suspension of the metal in the foam;

(d) adding a stabilizing agent to the foam after step (c), said stabilizing agent being a material that polymerizes upon contact with water;

(e) shaping the stabilized foam suspension;

(f) allowing the shaped and stabilized foam suspension to set; and (g) heating the set foam to a temperature high enough to pyrolize the organic material therein and to sinter the suspended metal powder.

* * * * *

UNITED STATES PATENT AND TRADEMARK OFFICE
CERTIFICATE OF CORRECTION

PATENT NO. : 4,569,821
DATED : 11 February 1986
INVENTOR(S) : Duperray et al.

It is certified that error appears in the above-identified patent and that said Letters Patent is hereby corrected as shown below:

Column 2, line 52: Change "forming" to --foaming--.

Column 2, line 62: Change "di-ioscyanate" to --di-isocyanate--.

Column 3, line 12: After "C." insert --,--; after "used" insert --,--.

Column 3, line 62: Change "forsee-" to --foresee---.

Column 4, line 36: After "cooling" insert --,--.

Signed and Sealed this

Twenty-ninth Day of July 1986

[SEAL]

Attest:

DONALD J. QUIGG

Attesting Officer

Commissioner of Patents and Trademarks